April 16, 1929.  F. ANDERSON  1,709,425
COMBINED SWEEP AND STACKER ATTACHMENT FOR TRACTORS
Filed Dec. 15, 1927  3 Sheets-Sheet 1
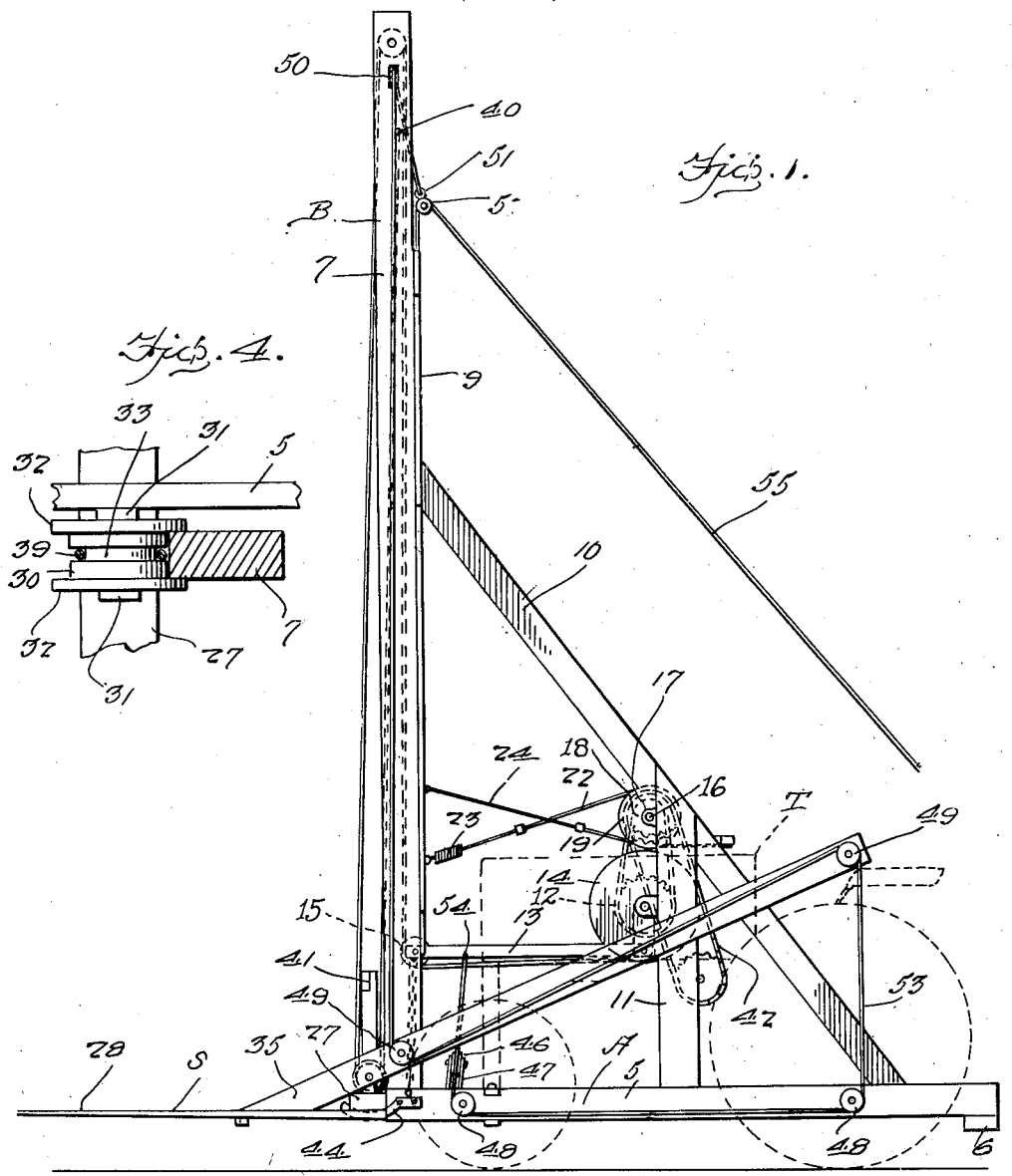
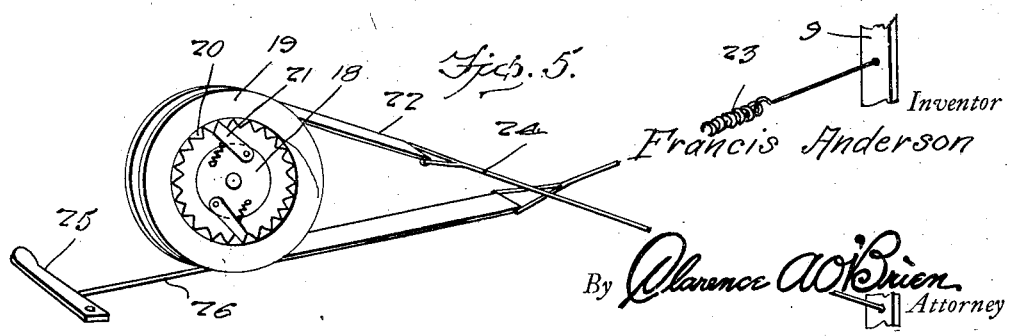
Inventor
Francis Anderson
By Clarence A. O'Brien
Attorney

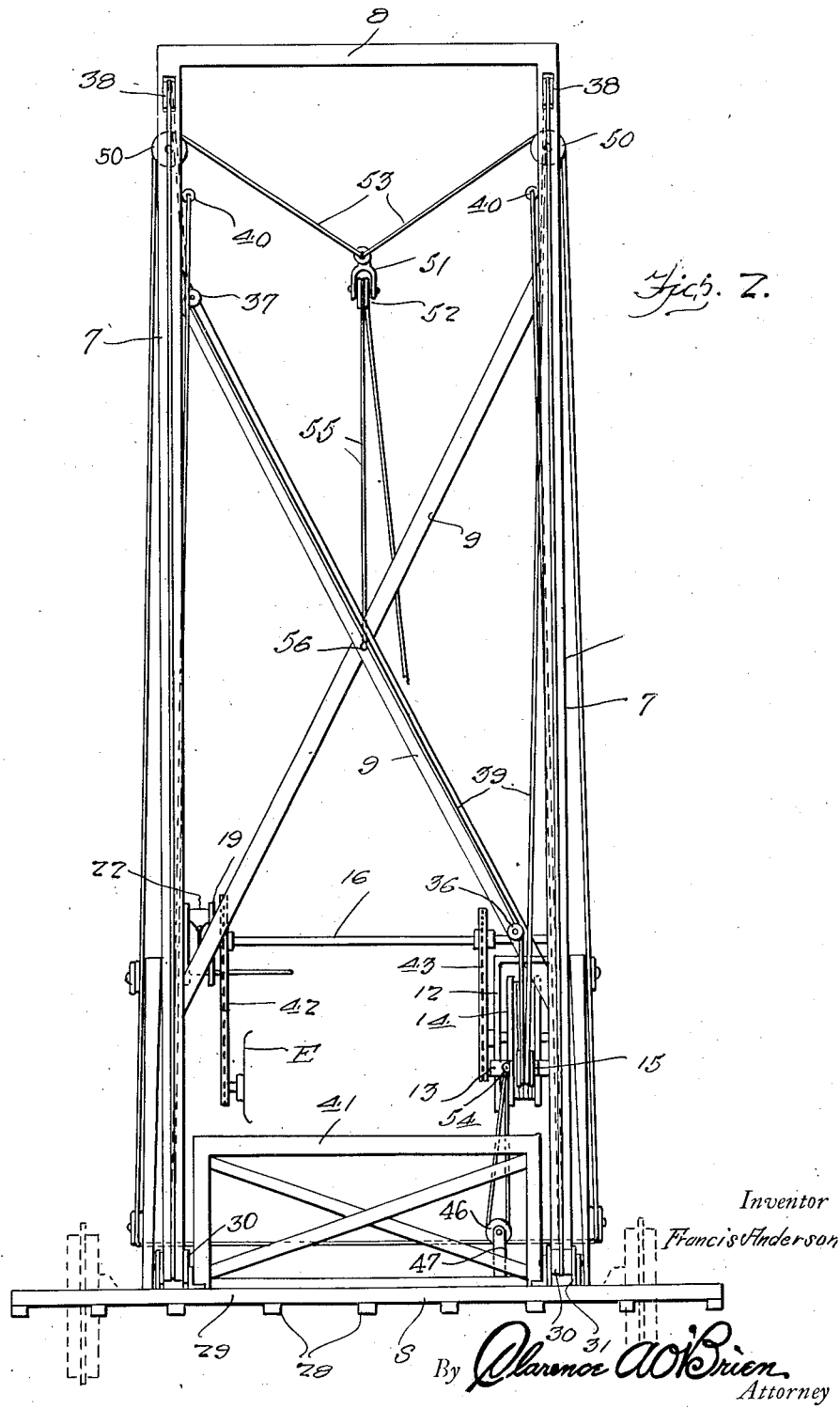

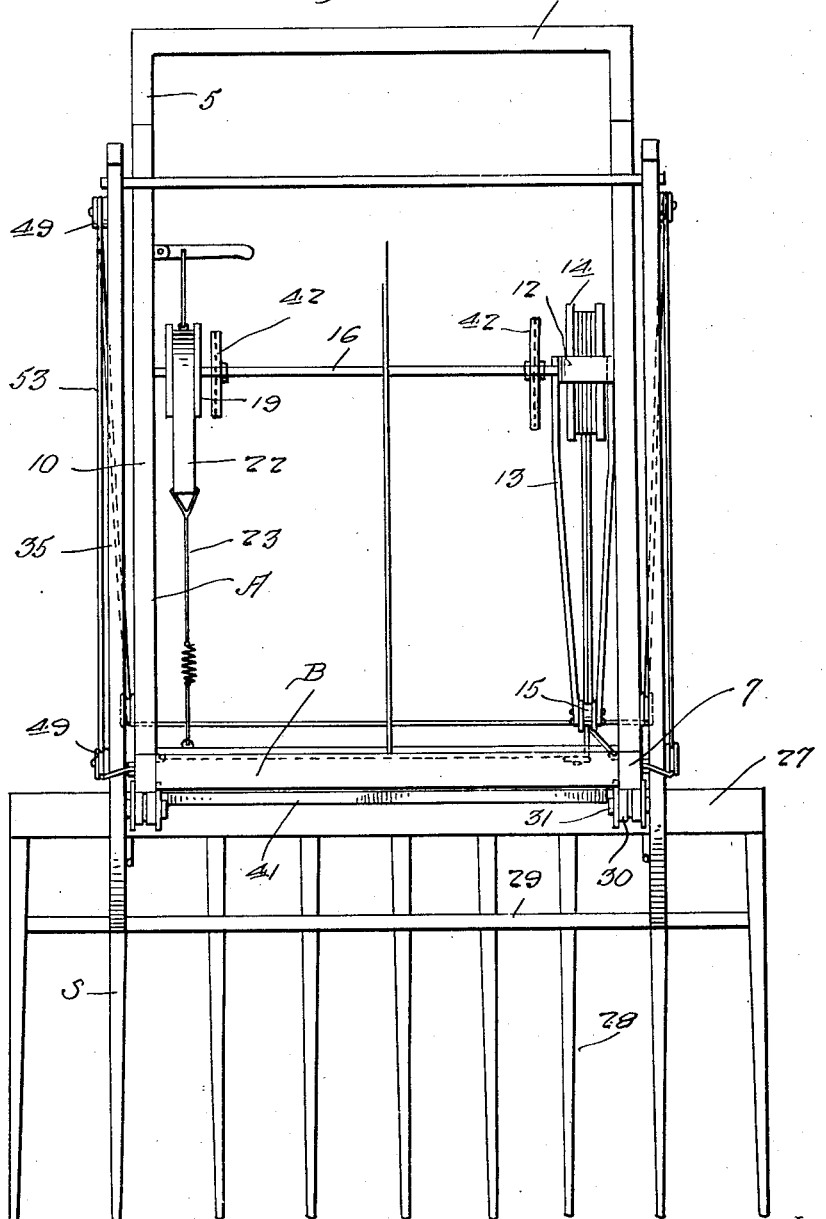

Patented Apr. 16, 1929.

1,709,425

UNITED STATES PATENT OFFICE.

FRANCIS ANDERSON, OF WAUSA, NEBRASKA.

COMBINED SWEEP AND STACKER ATTACHMENT FOR TRACTORS.

Application filed December 15, 1927. Serial No. 240,167.

The present invention relates to an attachment for tractors and has for its prime object to provide a structure including a sweep which may be raised by the power of the tractor for stacking purposes and may be conveniently dumped.

A still further very important object of the invention resides in the provision of an attachment of this nature which includes an upright frame structure and a sweep having flanged grooved rollers journaled thereon and riding on the frame and cables trained over the rollers in the grooves thereof for hoisting the sweep.

Another very important object of the invention resides in the provision of an attachment of this nature having a vertically movable sweep with cable and pulley means for raising the same operable by a drum operatively connected with a shaft on which is mounted a combined ratchet and braking structure.

A still further very important object of the invention resides in the provision of a combined sweep and stack attachment of this nature which is simple in its construction, strong and durable, easy to manipulate, convenient in its arrangement of parts, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the attachment embodying the features of my invention, Figure 2 is a front elevation thereof, Figure 3 is a top plan view thereof, Figure 4 is an enlarged detail horizontal section through one of the uprights showing particularly the construction of one of the sweep rollers which rides on the upright, and Figure 5 is a detail perspective view showing the construction of the combined ratchet and braking construction.

Referring to the drawing in detail it will be seen that the letter A denotes generally a horizontal frame while the letter B denotes generally an upright frame at the forward end of the frame A while the letter S denotes generally a sweep ridable on the upright frame B.

The horizontal frame A comprises a pair of longitudinal frame bars 5 one to each side of the tractor T denoted in dotted lines in Figure 1 and attached to the tractor by any suitable means (not shown) preferably to be located a slight distance above the ground. These frame bars 5 are connected at their rear ends by a cross bar 6. The frame B comprises a pair of uprights 7 rising from the forward end of the frame bars 5 and are connected at their upper ends by a cross bar 8. Cross braces 9 are mounted between the uprights 7. Braces 10 are mounted between intermediate portions of the uprights 7 and the rear end portions of the frame bars 5. Standards 11 rise from intermediate portions of the frame bars 5 and are connected to intermediate portions of the braces 10. A sheave frame 12 is mounted on one of the standards 11 and projects inwardly therefrom and has a forwardly directed extension 13. A sheave 14 is journaled in the frame 12. A pulley 15 is journaled on the forward end of the extension 13. A shaft 16 is journaled between the upper portions of the uprights 11 by means of suitable brackets 17. A drum 18 is fixed on the shaft 16 adjacent the other standard 11. A grooved ring 19 is mounted about the drum 18 and has an annular series of ratchet teeth 20 extending inwardly therefrom while the drum 18 is provided with one or more spring pressed pawls 21 engaged with the ratchet teeth 20. A strap 22 is disposed about the grooved ring 19 and has one end anchored to one of the braces 9 by means of a spring 23 while the other end is anchored to said last mentioned brace 9 by a cable 24 which crosses the spring 23. A lever 25 is pivotally mounted on the last mentioned upright and has a cable 26 engaged therewith and also engaged with the strap 22 adjacent the end connected with the spring 23 so that this lever may be rocked to release the tension of the spring 23 for allowing the ring 19 to slip in the strap 22. Ordinarily the spring 23 has sufficient tension to prevent the rotation or rather to brake the rotation of the ring 19.

The sweep S comprises a back piece 27 provided with a plurality of forwardly projecting tines 28 connected intermediate their ends adjacent their rear ends by a cross member 29. A pair of rollers 30 are journaled above the back piece 27 by means of bracket arms 31. Each roller 30 is provided with annular flanges 32 at its ends and with an annular groove 33 intermediate its ends. These rollers 30 ride on the uprights 7. A pair of arms 35 incline upwardly and rearwardly from the sweep S one to the outer side of each upright 7.

A pulley 36 is journaled on the lower portion of one of the braces 9. A pulley 37 is journaled on the upper portion of the last mentioned brace 9. Pulleys 38 are journaled in the upper ends of the uprights 7. A pair of cables 39 windable about the sheave 14, are trained over the pulley 15 and extend upwardly therefrom, one of the cables 39 being trained over pulleys 36 and 37. The cables are then trained over pulleys 38 and are trained over rollers 30 in the grooves 33 and then extend upwardly and have their ends anchored to the upper portions of the uprights 7 as at 40.

The shaft 16 is operatively connected with the engine E of the tractor T by a chain and sprocket mechanism 42. When this chain and sprocket mechanism is brought into operation the shaft 16 rotates so that the drum 18 revolves freely in the ring 19 with the pawls 21 slipping over the teeth 20. This rotation of the shaft 16 causes the rotation of the sheave 14 through the intermediacy of the chain and sprocket mechanism 43 so that the cables 39 wind on the sheave and hoist the sweep to the desired height when the chain and sprocket mechanism 42 is disconnected from the motor. The sweep is prevented from moving downwardly by the pawl and ratchet mechanism 21, 20 and the braking effect on the ring 19 by the strap 22 and the associated spring 23. When it is desired to lower the sweep the lever 25 is rocked to release the tension of the spring 23 so that the ring 19 may slip and then the sweep will gravitate downwardly on the upright frame B until the cross piece 27 rests in brackets 44 projecting forwardly from the front end of the frame bars 5. In order to load the sweep S the tractor is moved forwardly so that the material such as hay, straw, or the like collect on the tines 28, the sweep S being provided with a back structure 41 against which the material may pile.

A sheave 46 is mounted between the frame bars 5 and slightly thereabove and adjacent one of them by means of a bracket 47. A plurality of sheaves 48 are journaled on the side bars 5 one adjacent each end portion thereof. A pair of sheaves 49 are journaled on the arms 35 one adjacent each end portion thereof. Sheaves 50 are journaled in the upper portions of the uprights 7 below pulleys 38 and with their axis at right angles thereto. A pulley bracket 51 has a pulley 52 journaled therein and is connected to the ends of cables 53 which extend from the bracket 51 and are trained over the sheaves 50 and then extend downwardly and are trained under the forward sheaves 49 and then over the rearward sheaves 49 and then under sheaves 48 and then under the sheave 46 and have their ends anchored as at 54 to the extension 13. A cable 55 is anchored to the braces 9 as at 56 and is trained over the pulley 52. When the sweep is in its lowermost position the cables 53 are slack and as it moves upwardly the cables become taut to some slight extent because of the weight of the material on the sweep. When the sweep has reached the desired height, by loosening up on the cable 55 so as to lengthen the cables 53 between the rear ends of the arms 35 and the bars 5, the forward ends of the tines will incline downwardly and forwardly. The cable 55, of course, may be tied at a convenient place by the operator of the tractor and released when desired.

It is thought that the construction, operation and advantages of the invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A combined sweep and stacker attachment for tractors comprising a horizontal frame for mounting about a tractor, an upright frame rising from the forward portion of the horizontal frame, a sweep, brackets projecting forwardly from the horizontal frame on which the sweep rests when in a lowermost position, rollers, means for journalling the rollers on the sweep to ride on the upright frame, each roller comprising a body having end annular flanges and an intermediate annular groove, cables anchored to the upright frame and trained over the rollers in the groove, and means for winding the cables to raise the sweep.

2. A combined sweep and stacker attachment for tractors comprising an upright frame, a sweep, rollers mounted on the sweep to ride the upright frame, each roller comprising a body having end annular flanges and an intermediate annular groove, cables anchored to the upright frame and trained over the rollers in the grooves, and means for pulling the cables to raise the sweep.

3. A structure of the class described including an upright, a sweep, means for moving the sweep up and down the uprights, inclined bars on the sweep, pulleys on the bars, a base structure, pulleys on the base structure, pulleys in the upright, a cable trained over said pulleys and anchored at its ends, and means engaging the cables to hold the same taut to prevent the tilting of the sweep, said means being releasable.

In testimony whereof I affix my signature.

FRANCIS ANDERSON.